(12) United States Patent
Sakurai et al.

(10) Patent No.: US 7,536,922 B2
(45) Date of Patent: May 26, 2009

(54) FORCE SENSOR CHIP

(75) Inventors: Nobuhiro Sakurai, Wako (JP); Takeshi Ohsato, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 11/889,438

(22) Filed: Aug. 13, 2007

(65) Prior Publication Data

US 2008/0053247 A1 Mar. 6, 2008

(30) Foreign Application Priority Data

Aug. 30, 2006 (JP) ............................. 2006-234513

(51) Int. Cl.
*G01D 7/00* (2006.01)

(52) U.S. Cl. ................................. 73/862.041

(58) Field of Classification Search ............ 73/862.041, 73/862.044, 862.045, 862.042
See application file for complete search history.

(56) References Cited

U.S. PATENT DOCUMENTS 6,951,142 B2 * 10/2005 Ohsato et al. .......... 73/862.041

FOREIGN PATENT DOCUMENTS

JP 2003-207405 7/2003
JP 2003-254843 9/2003

OTHER PUBLICATIONS

U.S. Appl. No. 11/882,327, Ohsata, Takeshi, filed Jul. 31, 2007.*

* cited by examiner

*Primary Examiner*—Jewel Thompson
(74) *Attorney, Agent, or Firm*—Squire, Sanders & Dempsey L.L.P.

(57) ABSTRACT

In a force sensor chip, a semiconductor substrate includes: a plurality of operating parts each including an external-force acting area section and a non-deforming section; a supporting part for supporting the operating parts, and a plurality of connecting parts for connecting the operating parts and the supporting part. Strain resistance elements are provided on deformation-generating sections of the connecting parts. The plurality of operating parts are provided, in corresponding relation to the plurality of connecting parts, between the connecting parts and the supporting part.

12 Claims, 15 Drawing Sheets

FORCE SENSOR CHIP

FIELD OF THE INVENTION

The present invention relates generally to force sensor chips, and more particularly to an improved force sensor chip which has a plurality of strain resistance elements formed on a substrate using semiconductor manufacturing technology and which is suitable for use a six-axis force sensor or other device in an industrial robot or the like.

BACKGROUND OF THE INVENTION

As known in the art, automated working machines, such as machine tools and industrial robots, apply forces to workpieces and are themselves subjected to external forces because of the manner in which these machines operate. In this case, it is necessary for the working machines to detect external forces and moments applied to the machines and to perform control corresponding to the detected external forces and moments. In order to perform the control, corresponding to the detected external forces and moments, with a high degree of precision, it is required to accurately detect the external forces and moments.

In view of this situation, various types of force sensors have been proposed to date. Generally, the force sensors can be classified, according to the detection scheme employed, into elastic-type force sensors and equilibrium-type force sensors. The elastic-type force sensors measure a force on the basis of an amount of deformation proportional to the external force, while the equilibrium-type force sensors measure a force by balancing it with a known force.

Also known are force sensors whose structure is based on the principle that a plurality of strain resistance elements are provided in parts of a strain-generating body that is elastically deformable in response to an external force applied thereto. When an external force is applied to the strain-generating body of the force sensor, electrical signals corresponding to the degree of deformation (stress) of the strain-generating body are output from the plurality of strain resistance elements. Forces that have two or more components and are applied to the strain-generating body can be detected on the basis of these electrical signals, and a stress produced in the force sensor is calculated on the basis of the electrical signals.

Among examples of the conventionally-known elastic-type force sensors are six-axis force sensors, each of which includes a plurality of strain resistance elements provided in parts of a strain-generating body. The six-axis force sensors divide an external force applied thereto into stress components (i.e., forces Fx, Fy, Fz) in respective axial direction of three axes (i.e., X-axis, Y-axis and Z-axis) of an orthogonal coordinate system and into torque components (i.e., moments Mx, My, Mz) about the respective axis directions, and it detects the external force as six-axis components.

Generally, in the field of multi-axis force sensors, there would be encountered the problem of interference from other axes (i.e., inter-axis interference problem) that prevents individual components (i.e., forces and moments) of an external force, applied to the strain-generating body, from being accurately separated from one another or resolved with good precision. The inter-axis interference problem can not be ignored when putting a multi-axis force sensor to practical use.

As a technique for solving the inter-axis interference problem, the inventors of the present invention etc. proposed a six-axis force sensor, having a novel construction, in Japanese Patent Laid-Open Publication No. 2003-207405 (hereinafter "Patent Literature 1"). This proposed six-axis force sensor can provide a solution to the problem of interference from other axes (i.e., inter-axis interference problem) that prevents individual components (i.e., forces and moments) of an external force, applied to the strain-generating body, form being accurately separated from one another or resolved with good precision. In the proposed six-axis force sensor, a plurality of strain resistance elements are integrally assembled in a predetermined arrangement or layout pattern in parts of a strain-generating body on a semiconductor substrate by using semiconductor manufacturing processing. The proposed six-axis force sensor is formed using the semiconductor substrate of a substantially square planar shape, which includes: a supporting part located in an outer peripheral portion of the semiconductor substrate, an operating part located in a central portion of the semiconductor substrate and having a substantially square shape, and connecting parts connecting the four side of the square operating part and corresponding portions of the supporting part. The strain resistance elements are provided on boundary areas between the individual sides of the square operating part and the connecting parts. The proposed six-axis force sensor is arranged to solve the "inter-axis interference" problem through an improvement in the configuration of parts of the strain-generating body and optimization of the layout pattern of the plurality of strain resistance elements.

Further, in Japanese Patent Application Laid-open Publication No. 2003-254843 (hereinafter "Patent Literature 2"), a six-axis force sensor is proposed where a structure having an external-force buffering function is provided, in addition to the construction of the six-axis force sensor disclosed in Patent Literature 1, so that an external force, having been attenuated by the buffering structure is applied to the operating part. Thus, the six-axis force sensor disclosed in Patent Literature 2 can achieve an enlarged range of detectable external forces.

However, in each of the six-axis force sensor chips (semiconductor substrates) disclosed in Patent Literature 1 and Patent Literature 2 identified above, stress tends to concentrate in the operating part due to bending or twisting caused by axial force application, because the operating part is located in a central portion of the force sensor chip; particularly, such stress concentrates if the operating part has a relatively small area. If the operating part has a relatively large area, on the other hand, load bearing performance can be enhanced; however, there is a tradeoff between the enhanced load bearing performance and miniaturization of the operating part. As a consequence, the disclosed six-axis force sensors are considerably limited in design freedom depending on a state of stress occurring in the operating part.

SUMMARY OF THE INVENTION

In view of the foregoing prior art problems, it is an object of the present invention to provide an improved force sensor chip which allows an external force to be applied thereto in a dispersed manner so that stress occurring due to bending or twisting of a substrate of the chip can be dispersed, and which can have an enhanced design freedom.

In order to accomplish the above-mentioned object, the present invention provides an improved force sensor chip, which comprises: a base member including: a plurality of operating parts each including an external-force acting area section and a non-deforming section; a supporting part for supporting the operating parts, and a plurality of connecting parts for connecting the operating parts and the supporting part; and strain resistance elements provided on deformation-generating sections of the connecting parts. The plurality of operating parts are provided, in corresponding relation to the plurality of connecting parts, between the connecting parts and the supporting part.

Namely, the force sensor chip of the present invention includes the plurality of operating parts so that an external force input from the outside is applied to the individual operating parts in a dispersed manner. As a result, stress generated in response to bending or twisting of a base member (e.g., semiconductor substrate) of the force sensor chip can be dispersed, so that concentration of stress can be reliably prevented. Further, the construction (number, positions, shapes, etc.) of the operating parts can be modified as desired by modifying the number, positions, shapes, etc. of holes formed in the base member, with the result that design freedom of the sensor chip can be significantly enhanced.

BRIEF DESCRIPTION OF THE DRAWINGS

Certain preferred embodiments of the present invention will hereinafter be described in detail, by way of example only, with reference to the accompanying drawings, in which.

DETAILED DESCRIPTION OF THE PREFERRED EMBODIMENTS

Now, with reference to FIGS. 1-10, a description will be given about a force sensor chip in accordance with a first embodiment of the present invention. The instant embodiment of the force sensor chip will be described hereinbelow as being in the form of a six-axis force sensor chip, although the present invention is not limited to a six-axis force sensor chip.

Figure 1:
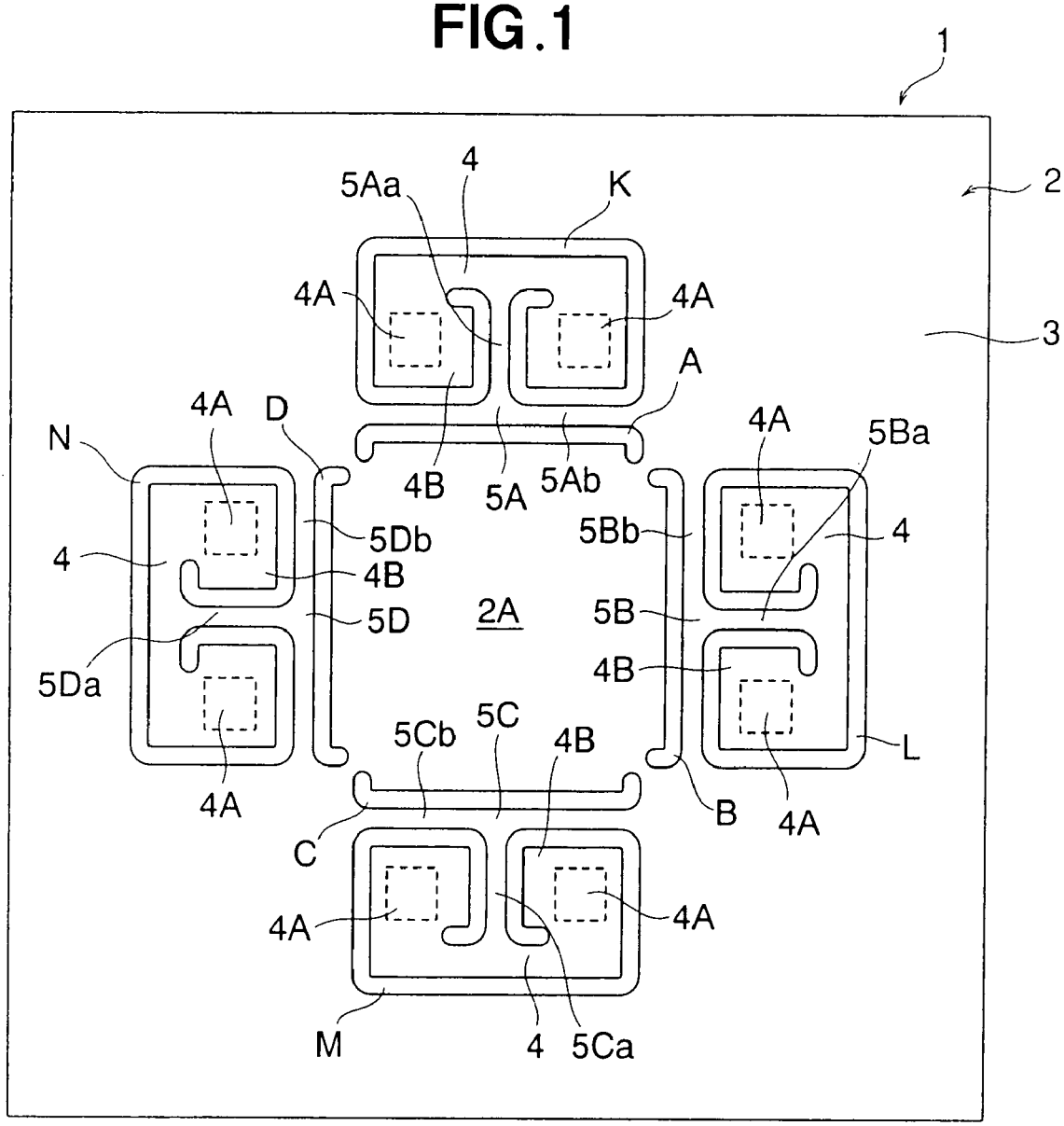
FIG. 1 is a plan view of a force sensor chip according to a first embodiment of the present invention.
Figure 2:
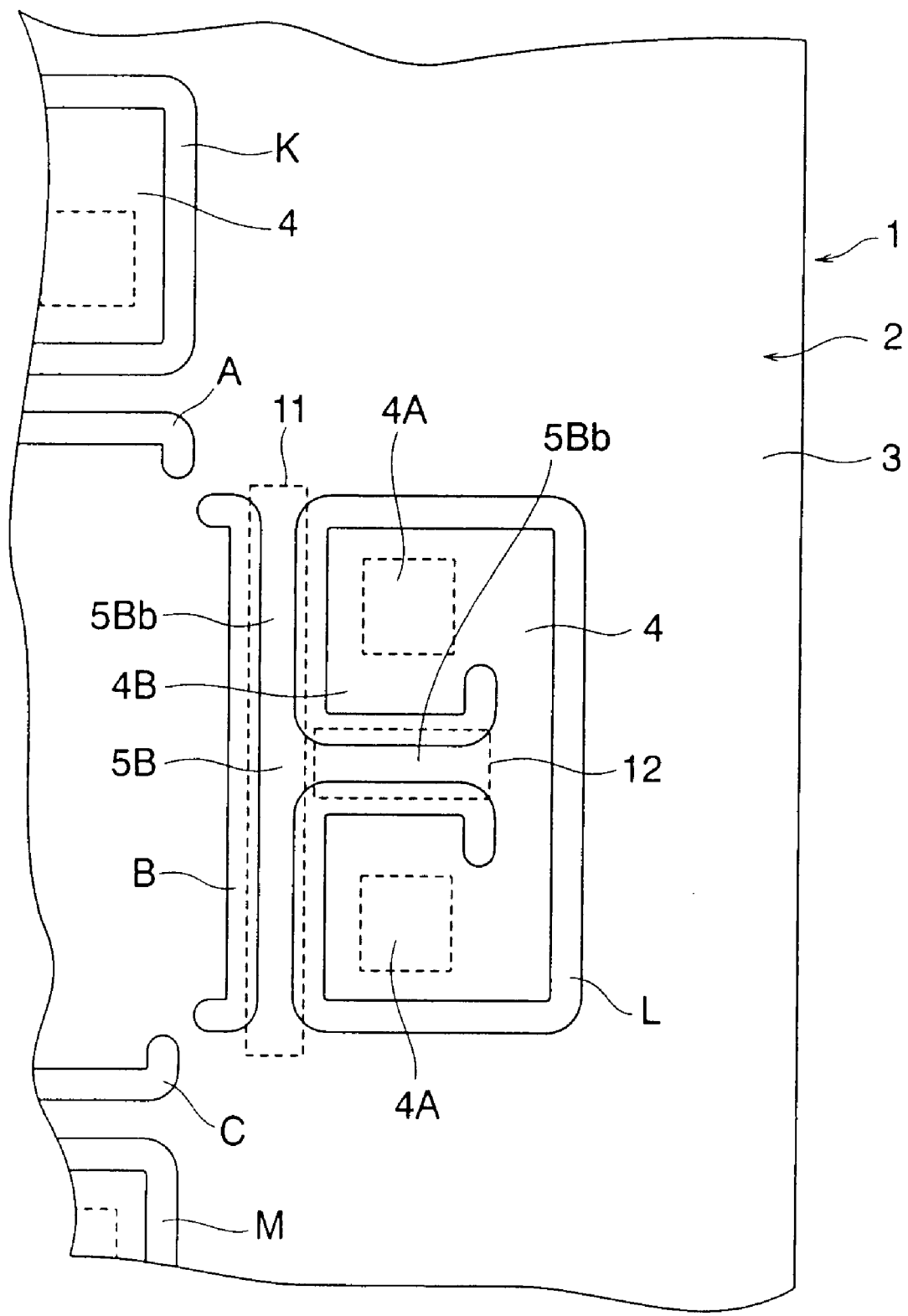
FIG. 2 is a fragmentary enlarged plan view showing in enlarged scale principal or relevant sections of the force sensor chip shown in FIG. 1.
Figure 3:
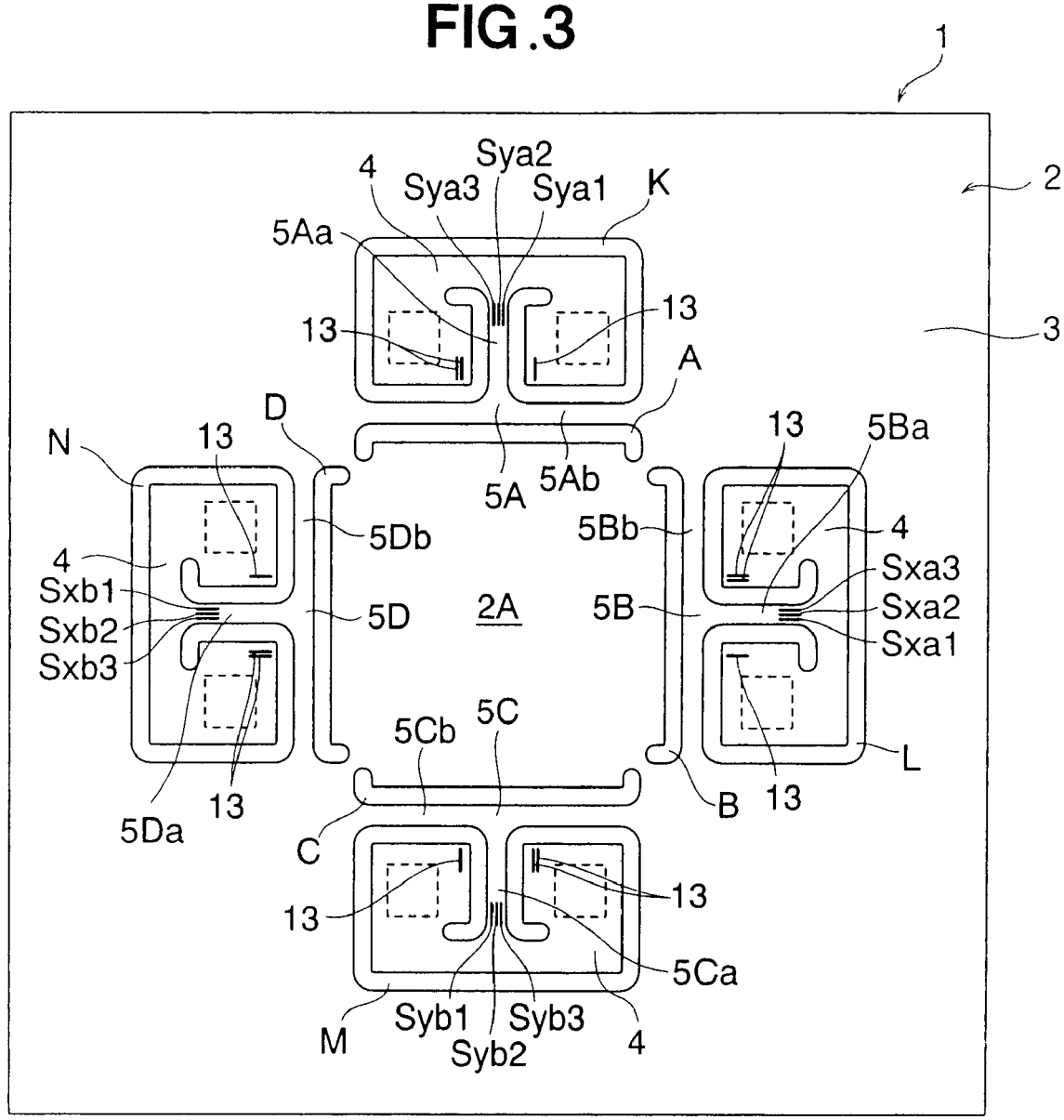
FIG. 3 is a top plan view showing a layout pattern of twelve strain resistance elements provided on a substrate of the force sensor chip shown in FIG. 1.
Figure 4:
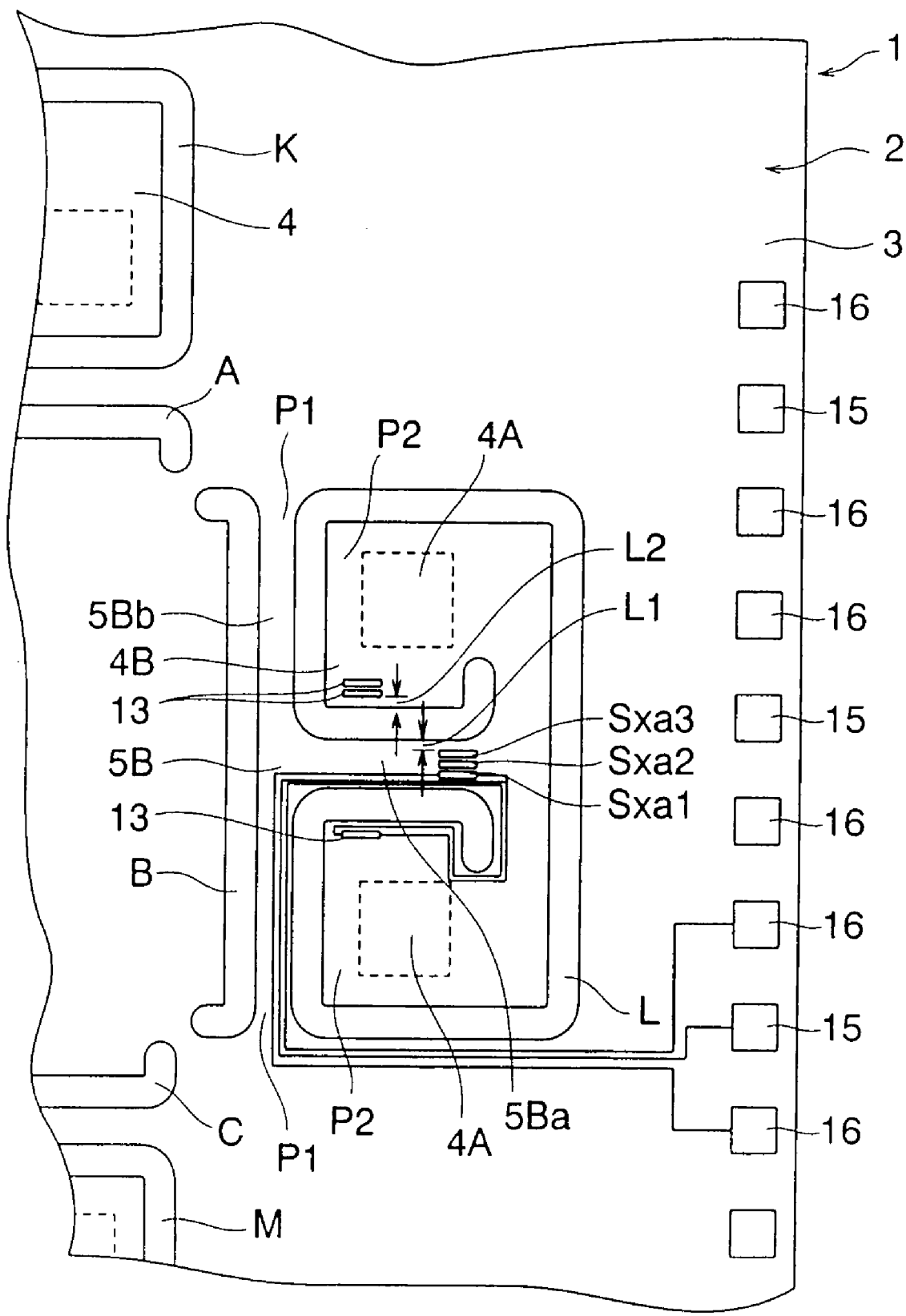
FIG. 4 is a fragmentary enlarged plan view showing electric wiring patterns for some of the strain resistance elements on the first embodiment of the force sensor chip shown in FIG. 1.
Figure 5:
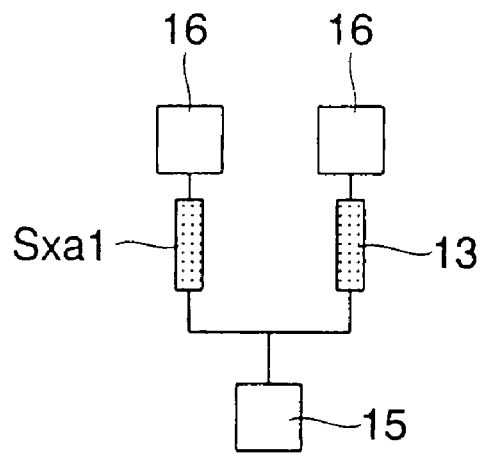
FIG. 5 is an electric circuit diagram showing an electric wiring pattern for one of the strain resistance elements and a temperature compensating resistance element corresponding thereto.
Figure 6:
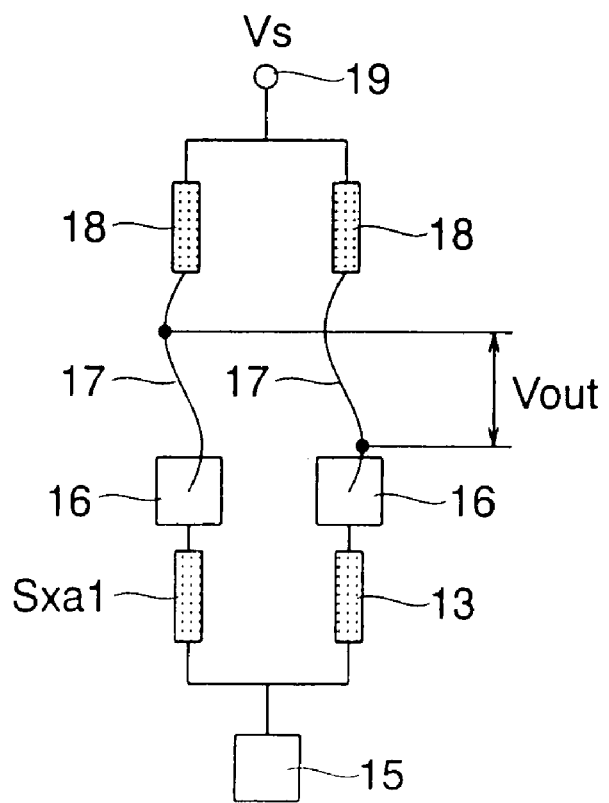
FIG. 6 is an electric circuit diagram showing a full-bridge wiring structure constructed by adding an external circuit to the electric wiring pattern shown in FIG. 5.

FIG. 1 is a plan view showing one surface (i.e., front surface) of the force sensor chip 1, and FIG. 2 shows in enlarged scale characteristic sections in FIG. 1. In FIGS. 1 and 2, there is only shown a planer shape of a base member (in this case, semiconductor substrate) 2 with illustration of strain resistance elements and wiring patterns omitted. FIG. 3 shows twelve strain resistance elements and some of electric wiring patterns and electrode pads provided on the semiconductor substrate 2 of the force sensor chip. FIG. 4 is a view, similar to FIG. 2, which shows in enlarged scale principal or relevant sections of FIG. 3 and particularly shows a region where some of the strain resistance elements are provided. FIGS. 5 and 6 show electric circuit constructions, and FIGS. 7-10 show directions of applied external forces and are explanatory of mathematical expressions used for determining the applied external forces.

As shown in FIG. 1, the instant embodiment of the force sensor chip 1 is formed using the base member (semiconductor substrate) 2 preferably having a substantially square shape as viewed in plan. Although the base member 2 will hereinafter be described as being a semiconductor substrate, it is not limited to a semiconductor substrate. Because of the semiconductor substrate 2 having a substantially square planar shape, the force sensor chip 1 has a plate shape as a whole.

In the case where the base member 2 is a semiconductor substrate, the square semiconductor substrate is provided with the planar shape, predetermined holes are formed and the semiconductor substrate itself is processed preferably, by applying, to the one surface (front surface) thereof, semiconductor manufacturing technology (e.g., resist patterning and etching process, such as photolithography, ion implantation, and film-forming process, such as p-CVD (plasma Chemical Vapor Deposition), sputtering or RIE (Reactive Ion Deposition)). The sensor chip 1 is manufactured by performing film-forming on a predetermined area of the one surface of the semiconductor substrate 2.

Thus, the force sensor chip 1 according to the instant embodiment is formed as a semiconductor sensor device.

In the force sensor chip 1, a function section for detecting six-axis components as a six-axis force sensor comprises a total of twelve strain resistance elements or piezoelectric resistance elements (hereinafter referred to as "resistance elements") composed of active layers (or thermal diffusion layers) formed by ion implantation in the front surface of the semiconductor substrate 2.

Layout of the twelve resistance elements in the first embodiment is shown in FIG. 3, and some of the resistance elements are shown in enlarged scale in FIG. 4. As shown in FIG. 3, the twelve resistance elements are disposed, as sets of three elements (Sxa1, Sxa2, Sxa3), (Sxb1, Sxb2, Sxb3), (Sya1, Sya2, Sya3) and (Syb1, Syb2, Syb3), on respective deforming (i.e., strain-generating) sections of four connecting parts 5A-5D as will be later described. The respective deformation-generating sections of the four connecting parts 5A-5D are, for example, areas adjacent to boundaries between the connecting parts 5A-5D and operating parts 4 corresponding to the connecting parts 5A-5D. Each of the connecting parts 5A-5D has an inverted-T shape with its bridge section integrally connecting with a middle portion of an elastic section thereof.

More specifically, the set of resistance elements Sxa1, Sxa2, Sxa3 is provided on the deformation-generating section of the connecting part 5B, the set of resistance elements Sxb1, Sxb2, Sxb3 is provided on the deformation-generating section of the connecting part 5D, the set of resistance elements Sya1, Sya2, Sya3 is provided on the deformation-generating section of the connecting part 5A, and the set of resistance elements Syb1, Syb2, Syb3 is provided on the deformation-generating section of the connecting part 5C.

Note that illustration of the abovementioned twelve resistance elements is omitted in FIG. 1 for simplicity. In FIG. 4, a layout pattern of the set of resistance elements Sxa1, Sxa2, Sxa3 is shown in enlarged scale by way of example.

The force sensor chip 1 further includes temperature compensating resistance elements (indicated at 13 in FIGS. 3 and 4), each formed of an active layer (thermal diffusion layer), provided in corresponding relation to the twelve resistance elements Sxa1-Sxa3, Sxb1-Sxb3, Sya1-Sya3 and Syb1-Syb3. These temperature compensating resistance elements are disposed on respective non-deforming area sections of the four operating parts 4.

As clearly shown in FIG. 1, the semiconductor substrate 2 has a total of eight holes A, B, C, D, K. L. M and N formed through the thickness of the plate-shape substrate 2. With these elongated holes A, B, C, D, K. L. M and N, the force sensor chip 1 is functionally separated into a plurality of areas, such as the aforementioned parts.

Each of the elongated holes A, B, C, D, K. L. M and N is of a slit-like shape having a relatively small width. Of these holes, the four inner holes A, B, C and D each have a substantially linear slit shape, and the four outer holes K, L, M and N each have a slit shape to define one of the four operating parts 4.

The semiconductor substrate 2, forming the force sensor chip 1, includes: a central part 2A of a substantially square shape formed by the four linear slit-like holes A-D; four operating parts 4 formed by the holes K-N in correspondence with the individual sides of the central part 2A; a supporting part 3 of a substantially square ring shape surrounding the central part 2A and four operating parts 4; and four T-shaped connecting parts 5A, 5B, 5C and 5D located between and connecting the operating parts 4 and the supporting part 3 in correspondence with the individual sides of the central part 2A. The four operating parts 4 are defined by forming the holes K, L, M and N in the semiconductor substrate 2. The four T-shaped connecting parts 5A, 5B, 5C and 5D are defined between the inner holes A, B, C and D and the outer holes K, L, M and N. The connecting parts 5A, 5B, 5C and 5D each have an elastic section and a bridge section (or connecting arm section) as will be later described.

In the semiconductor substrate 2, the peripheral or surrounding supporting part 3 is a part that is supported, for example, from below by a support base as it is assembled to the six-axis force sensor unit. Further, each of the operating parts 4 is a part that is directly subjected to (i.e., directly receives) an external force, load or the like (hereinafter referred to as "external force") when such an external force is transmitted to the substrate 2 via a connecting rod. Each of the operating parts 4 includes, for example, two external-force acting area sections 4A and a non-deforming area section 4B formed in the other area than the external-force acting area sections 4A. Any external force, input from the outside, is applied dispersedly to the individual operating parts 4 and to the two external-force acting area sections 4A of each of the operating parts 4. Thus, the semiconductor substrate 2 of the force sensor chip 1 receives the applied external force by means of a total of eight external-force acting area sections 4A.

The connecting parts 5A, 5B, 5C and 5D are deformation-generating sections (strain-generating sections) that, when deformation and positional variation (displacement) occurs in the operating parts 4 due to an external force applied to the operating parts 4, notably deform and positionally vary in response to the deformation and positional variation in the operating parts 4; the greatest stress occurs in the deformation-generating sections (strain-generating sections) among the supporting part 3, operating parts 4, connecting parts 5A-5D, etc.

In each of the operating parts 4, the two external-force acting area sections 4A are sections to which an external force is input. As seen in FIG. 1, the four connecting parts 5A-5D, located inwardly of the operating parts 4, are each in the form of a T-shaped beam, which includes bridge and elastic sections 5A$a$ and 5A$b$, 5B$a$ and 5B$b$, 5C$a$ and 5C$b$, or 5D$a$ and 5D$b$. Each of the bridge sections 5A$a$, 5B$a$, 5C$a$ and 5D$a$ functions, in the connecting part 5A, 5B, 5C or 5D, as a connecting arm section connecting to the corresponding operating section 4. Further, each of the elastic sections 5A$b$, 5B$b$, 5C$b$ and 5D$b$ is provided in a region located outwardly of the corresponding hole A, B, C or D, and, in that region, it connects at opposite ends of its length to the supporting part 3. Further, each of the bridge sections 5A$a$, 5B$a$, 5C$a$ and 5D$a$ of the connecting part 5A-5D connects at one end (i.e., outer end) of its length to a middle portion of the corresponding operating part 4 and connects at the other end (i.e., inner end) of its length to a middle portion of the corresponding elastic section. The connecting parts 5A-5D each including the bridge and elastic sections, connecting sections between the connecting parts 5A-5D and the operating parts 4 and connecting sections between the connecting parts 5A-5D and the supporting section 3 are formed integrally on the semiconductor substrate 2.

In FIG. 2 representatively showing one of the connecting parts (i.e., connecting part 5B), reference numeral 11 indicates the elastic section 5B$b$, and 12 indicates the connecting arm section 5B$a$.

Connecting sections between the bridge sections 5A$a$, 5B$a$, 5C$a$ and 5D$a$, elastic sections 5A$b$, 5B$b$, 5C$b$ and 5D$b$ and operating sections 4 are formed into arcuate shapes so that stress due to an external force applied to the two external-force acting area sections 4A of each of the four operating parts 4 can be appropriately dispersed and the connecting sections can have a sufficient strength against the applied external force.

Note that the holes A-D and K-N are not limited to the above-mentioned shapes. In any case, the holes A-D and K-N are formed, taking into account the size of the force sensor chip 1, number of the strain resistance elements, range of detectable stress, etc., so that strain occurs most prominently in the twelve resistance elements Sxa1-Sxa3, Sxb1-Sxb3, Sya1-Sya3, Syb1-Syb3, no strain occurs in the positions of the temperature compensating resistance elements 13 and temperature condition of the temperature compensating resistance elements 13 is similar to that of the twelve strain resistance elements.

The central part 2A formed by boring the holes A-D in the semiconductor substrate 2 may be dispensed with as necessary. Namely, even where there is no such central part 2A, no functional problem arises with the force sensor chip 1. However, it is preferable that the central part 2A be not replaced with an opening because undesired semiconductor chips etc. may be produced by the formation of the opening.

Further, the external-force acting area sections 4A of the four operating parts 4 are located at equal distances from the center of the semiconductor substrate 2 and spaced at equal intervals from one another along an imaginary circumference about the center of the semiconductor substrate 2.

Specific layout of the twelve resistance elements Sxa1, Sxa2, Sxa3, Sxb1, Sxb2, Sxb3, Sya1, Sya2, Sya3, Syb1, Syb2 and Syb3 is as follows. The resistance elements Sxa1, Sxa2 and Sxa3 are formed on the connecting part 5B in the neighborhood of the connecting section between the operating part 4 and the bridge section 5B*a*. Namely, the resistance elements Sxa1, Sxa2 and Sxa3 are formed on the surface of the connecting part 5B in the strain-generating or deformation-generating section where stress occurs in response to an external force applied to the two external-force acting area sections 4A of the operating section 4 and thus strain occurs most prominently. Further, the resistance elements Sxa1, Sxa2 and Sxa3 are arranged side by side at equal intervals therebetween in a width direction of the bridge section 5B*a*, with their lengths extending parallel to the longitudinal axis of the bridge section 5B*a*. The middle resistance element Sxa2 is located on the longitudinal centerline of the bridge section 5B*a*.

Similarly, the other resistance elements Sya1-Sya3, Syb1-Syb3 and Sxb1-Sxb3 are formed in the neighborhood of the connecting section between the operating part 4 and the bridge section 5A*a*, in the neighborhood of the connecting section between the operating part 4 and the bridge section 5C*a* and in the neighborhood of the connecting section between the operating part 4 and the bridge section 5D*a*.

Further, as shown in FIG. 4, the temperature compensating resistance elements 13 provided individually in corresponding relation to the resistance elements Sxa1, Sxa2 and Sxa3 are located on the non-deforming area section 4B of the operating section 4. The three resistance elements Sxa1-Sxa3 and the three temperature compensating resistance elements 13 are associated in a relationship of one-to-one correspondence. Each of the three temperature-compensating resistance elements 13 is in a state such that its temperature condition is substantially the same as that of the corresponding strain resistance element, and it is formed on the surface of the non-deforming section 4B that does not deform even when the operating part 4 receives an external force. The instant embodiment performs force and moment measurement without being influenced by an ambient temperature, by constantly compensating measured results of resistance changes in the external-force measuring resistance elements (i.e., strain resistance elements) on the basis of the temperature-compensating resistance elements 13 remaining uninfluenced by an external force.

In FIG. 4, distances L1 and L2 are equal to each other; namely, the distance, from one edge of a corresponding (i.e., nearest) one of the holes A-M, of each set of the resistance elements is equal to the distance, from one edge of a corresponding one of the holes A-M, of each set of the temperature compensating elements 13.

For the other resistance elements Sya1-Sya3, Syb1-Syb3 and Sxb1-Sxb3 as well, the temperature-compensating resistance elements 13 are formed on the non-deforming sections 4B of the corresponding operating parts 4 in a similar layout pattern to the temperature compensating resistance elements 13 for the resistance elements Sxa1-Sxa3.

The following paragraphs describe electric wiring patterns for the twelve Sxa1, Sxa2, Sxa3, Sxb1, Sxb2, Sxb3, Sya1, Sya2, Sya3, Syb1, Syb2 and Syb3 and corresponding temperature compensating resistance elements 13. Specifically, electric wiring patterns for the resistance elements Sxa1, Sxa2 and Sxa3 and corresponding temperature compensating resistance elements 13 will be described with reference to FIGS. 5 and 6.

Because the electric wiring pattern is the same for each of the pairs of the resistance elements Sxa1, Sxa2 and Sxa3 and temperature compensating resistance elements 13, only the electric wiring pattern for the resistance element Sxa1 and temperature compensating resistance element 13 will be described representatively with reference to FIGS. 4-6. In FIG. 4, signal electrode pads 16, GND electrode pads 15, etc. for the other two resistance elements Sxa2 and Sxa3 are also shown.

The electric wiring pattern for the resistance element Sxa1 and temperature compensating resistance element 13*el* has a structure that forms a half-bridge circuit as shown in FIG. 5. Whereas it is common to build a full-bridge circuit in a force sensor chip, external resistors may be added to a half-bridge circuit to construct a full-bridge circuit as a whole. The instant embodiment employs such a construction where external resistors are added to a half-bridge circuit to construct a full-bridge circuit as a whole. In FIG. 5, a connection point between one ends of the resistance element Sxa1 and corresponding temperature compensating resistance element 13 is connected to the GND electrode pad 15, and the other ends of the resistance element Sxa1 and corresponding temperature compensating resistance element 13 are connected to the respective signal electrode pads 16.

FIG. 6 shows a full-bridge wiring structure constructed by connecting external wires 17 to the two signal electrode pads 16 of the electric wiring pattern of FIG. 5 and connecting respective one ends of two ceramic-made external resistors 18 to the external wires 17. Power supply voltage Vs is applied to the other ends or terminals 19 of the two ceramic-made external resistors 18. By forming the full-bridge wiring structure of FIG. 6 for the resistance element Sxa1, a voltage between the two external wires 17 can be taken out as a temperature-compensated output, i.e. element output Vout, of the resistance element Sxa1.

Layout patterns and electric wiring patterns for the other resistance elements Sya1-Sya3, Syb1-Syb3 and Sxb1-Sxb3 are the same as the aforementioned layout patterns and electric wiring patterns for the resistance elements Sxa1-Sxa3; the layout patterns and electric wiring patterns for the other resistance elements Sya1-Sya3, Syb1-Syb3 and Sxb1-Sxb3 only differ in position from the latter.

With reference to FIGS. 7-10, the following paragraphs explain a direction of an external force applied to the force sensor chip 1 and mathematical expressions for determining the applied external force.

Any external force applied to the force sensor chip 1 comprises six axial components (i.e., axial forces) Fx[N], Fy[N], Fz[N], Mx[N.cm], My[N.cm] and Mz[N.cm]. The following paragraphs give a description mainly about the axial components Fx, Fz, My and Mz as representative examples.

In each of FIGS. 7-10, there is defined a three-dimensional orthogonal coordinate system 21 comprising X, Y and Z axes.

Figure 7:
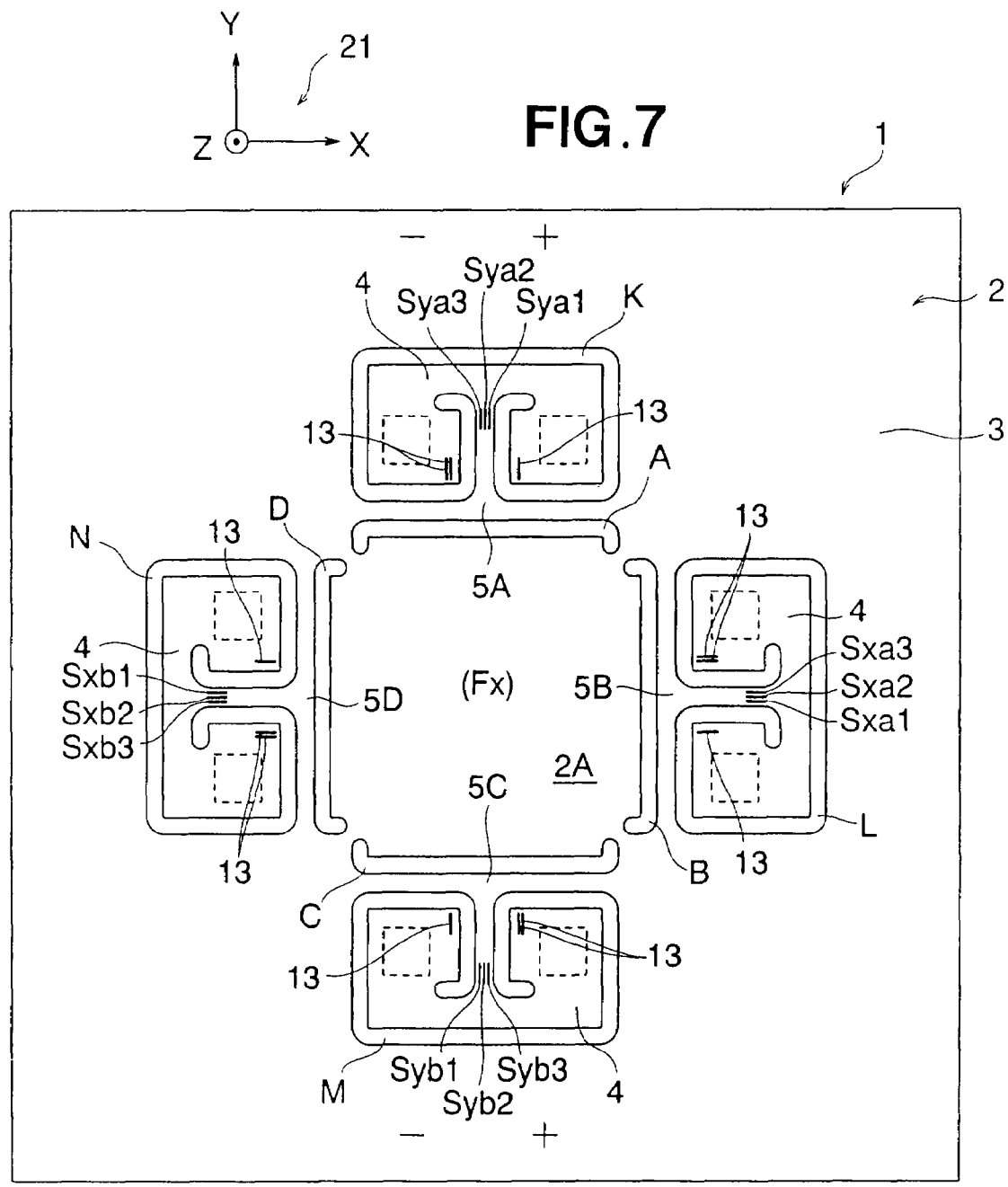
FIG. 7 is a plan view explanatory of an example of behavior of the first embodiment of the force sensor chip when a force Fx acts on the force sensor chip.

FIG. 7 shows an example of behavior of the force sensor chip 1 when an external force Fx is applied to the force sensor chip 1. The external force Fx is defined as a force in the X-axis direction. In FIG. 7, two different marks "+" and "−" are indicated for each of the sets of the resistance elements (Sya1, Sya2, Sya3) and (Syb1, Syb2, Syb3). The "+" mark indicates that the resistance values of the resistance elements provided in a portion corresponding to the position of the mark increase when the external force Fx is applied to the force sensor chip 1, while the "−" mark indicates that the resistance values of the resistance elements provided in a portion corresponding to the position of the mark decrease when the external force Fx is applied to the force sensor chip 1. The other resistance elements than the sets of the resistance element (Sya1, Sya2, Sya3) and (Syb1, Syb2, Syb3) do not change in their resistance value when the external force Fx is applied to the force sensor chip 1.

Detection apparatus comprising external measurement equipment, which detects output signals from the force sensor chip 1, performs arithmetic operations on signals, representative of resistance change rates, obtained from the twelve strain resistance elements of the force sensor chip 1. Six signals (calculated resistance change rates) Sig1 (≈Fx), Sig2 (≈Fy), Sig3 (≈Fz), Sig4 (≈Mx), Sig5 (≈My) and Sig6 (≈Mz) are ultimately output, as calculated resistance change rates, from the force sensor chip 1 following the arithmetic processing by the external measurement equipment. If values of the resistance change rates obtained from the twelve strain resistance elements Sxa1-Sxa3, Sya1-Sya3 and Sxb1-Sxb3 and Syb1-Syb3, i.e. element outputs Vout explained above in relation to FIG. 6, are indicated as signals Sigd and signal change rates of the signals Sigd are indicated as R'Sxa1, R'Sxa2, R'Sxa3, R'Sya1, R'Sya2, R'Sya3, R'Sxb1, R'Sxb2, R'Sxb3, R'Syb1, R'Syb2 and R'Syb3, the resistance-change-rate signal Sig1 in the example of FIG. 7 etc. can be determined on the basis of the following mathematical expressions. The scheme for determining the calculated resistance change rates in the present invention is similar to the one disclosed in patent literature 1 above or in Japanese Patent Laid-Open Publication No. 2006-125873.

Resistance value of each of the resistance elements is measured on the basis of current-voltage characteristics of the resistance element, so that a resistance value change rate, responsive to an applied external force, of the resistance element is determined. The resistance value of each of the resistance elements has the characteristic that it changes in response to strain produced in the semiconductor substrate 2.

At the time of application of the axial force Fx as shown in FIG. 7, the resistance elements Sya1, Sya3, Syb1, Syb3 detect strain, and the resistance-change-rate signal Sig1 is determined as $$\text{Sig1}(\approx Fx) = ((R'Sya1 - R'Sya3) + (R'Syb3 - R'Syb1))/4$$

As implied above, the "+" mark in FIG. 7 indicates that a resistance-increasing tensile force is acting on the resistance element in question due to the application of the external force Fx, while the "−" mark in FIG. 7 indicates that a resistance-decreasing compressive force is acting on the resistance element in question due to the application of the external force Fx. The same explanation of the "+" mark and "−" mark applies to illustrated examples of FIGS. 8 to 10.

At the time of application of the axial force Fy (not shown), the resistance elements Sxa1, Sxa3, Sxb1, Sxb3 detect strain, and the resistance-change-rate signal Sig2 is determined as $$\text{Sig2}(\approx Fy) = ((R'Sxa3 - R'Sxa1) + (R'Sxb1 - R'Sxb3))/4$$

Figure 8:
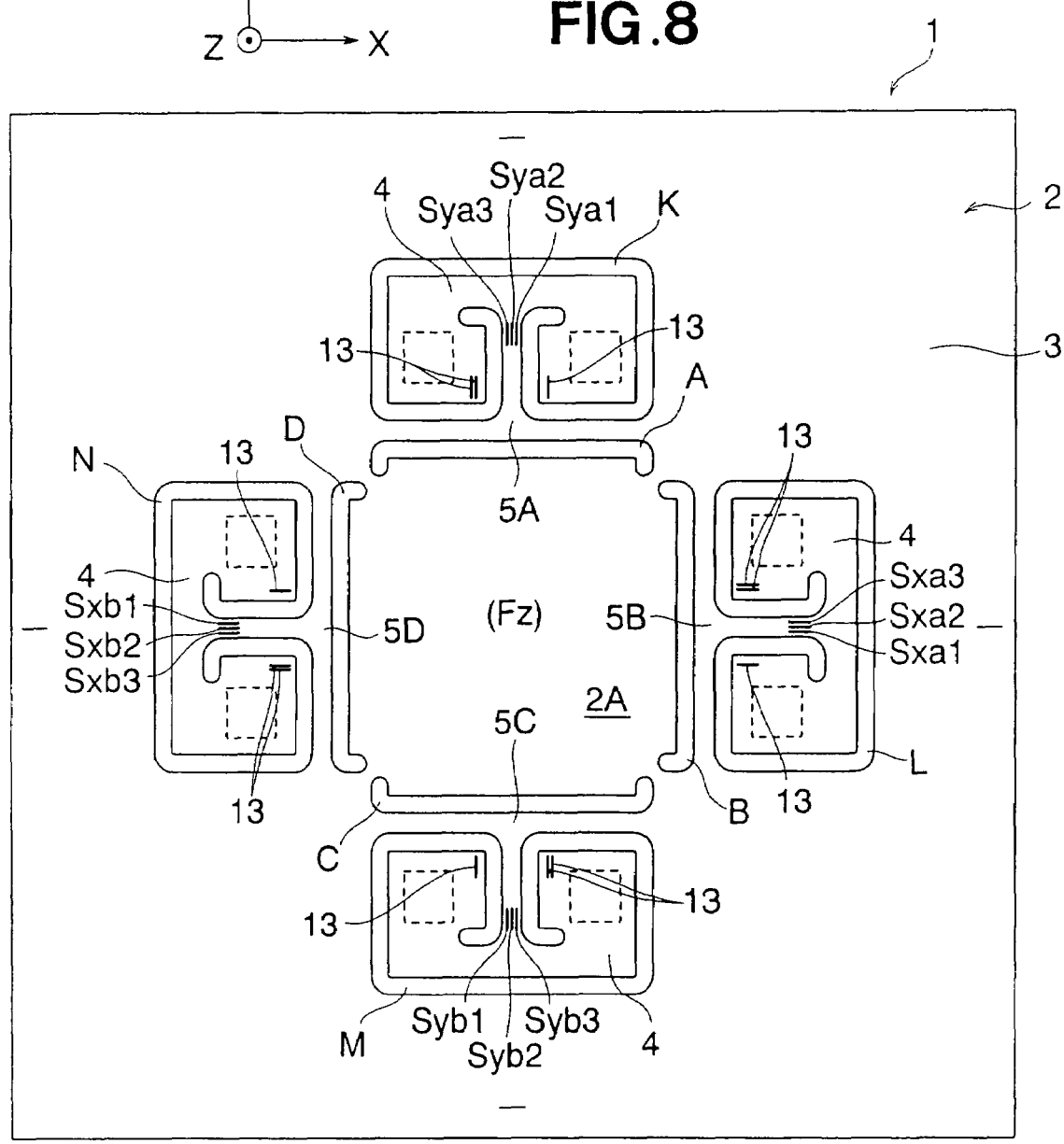
FIG. 8 is a plan view explanatory of an example of behavior of the first embodiment of the force sensor chip when a force Fz acts on the force sensor chip.

Further, FIG. 8 shows an example of behavior of the force sensor chip 1 when an external force Fz is applied to the force sensor chip 1. Namely, at the time of application of the axial force Fz, the resistance elements Sxa2, Sya2, Sxb2, Syb2 detect strain, and the resistance-change-rate signal Sig3 is determined as $$\text{Sig3}(\approx Fz) = ((R'Sxa2 + R'Sya2 + R'Sxb2 + R'Syb2)/4$$

Figure 9:
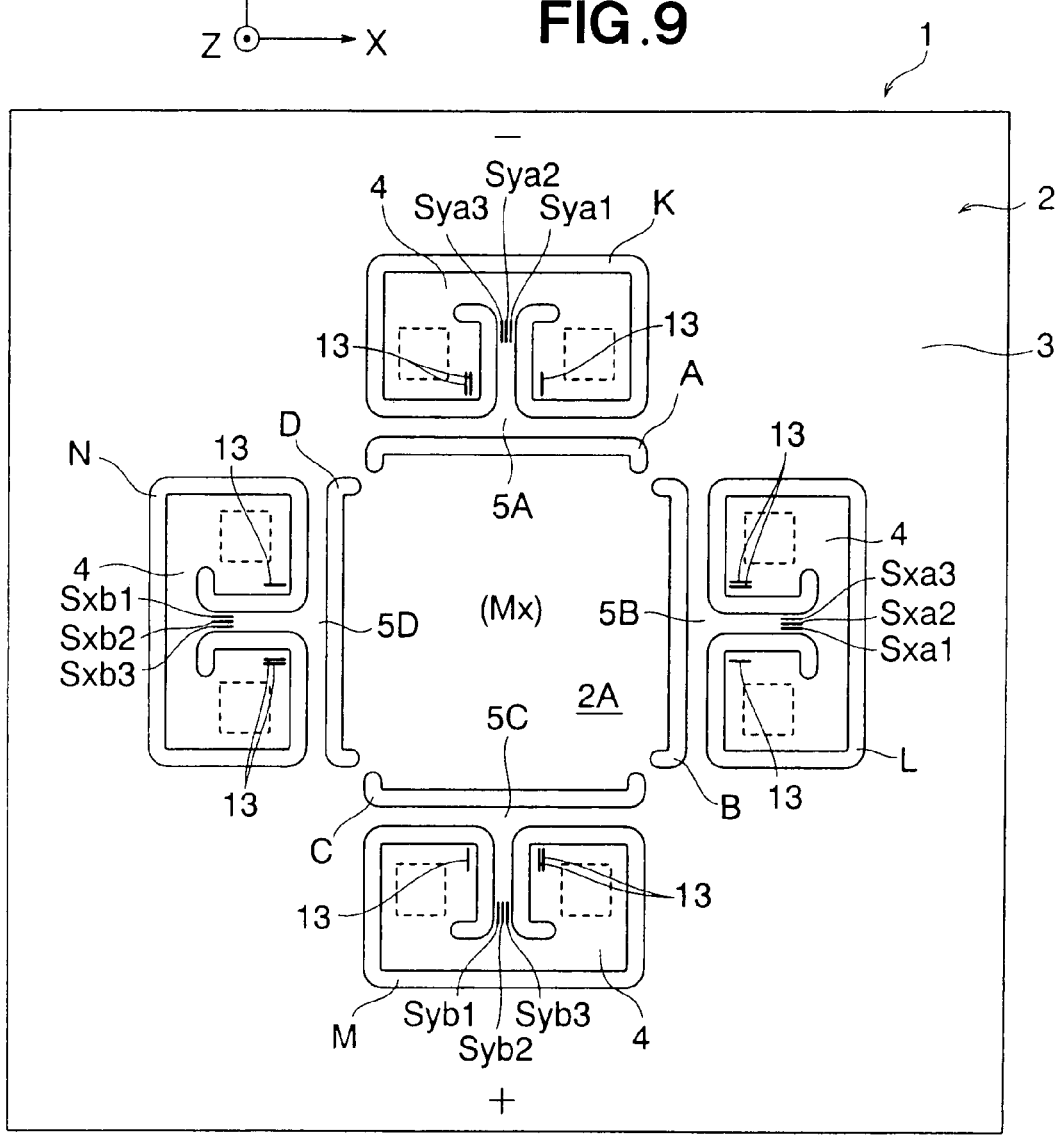
FIG. 9 is a plan view explanatory of an example of behavior of the first embodiment of the force sensor chip when a moment My acts on the force sensor chip.

FIG. 9 shows an example of behavior of the force sensor chip 1 when a moment Mx is applied to the force sensor chip 1. Namely, at the time of application of the moment Mx, the resistance elements Sya2, Syb2 detect strain such that the resistance value of the resistance elements Syb2 increases while the resistance value of the resistance elements Sya2 decreases, and the resistance-change-rate signal Sig4 is determined as $$\text{Sig4}(\approx Mx) = ((R'Syb2 - R'Sya2)/2$$

Similarly, at the time of application of the moment My (not shown), the resistance elements Sxa2, Sxb2 detect strain, and the resistance-change-rate signal Sig5 is determined as $$\text{Sig5}(\approx My) = ((R'Sxa2 - R'Sxb2)/2$$

Figure 10:
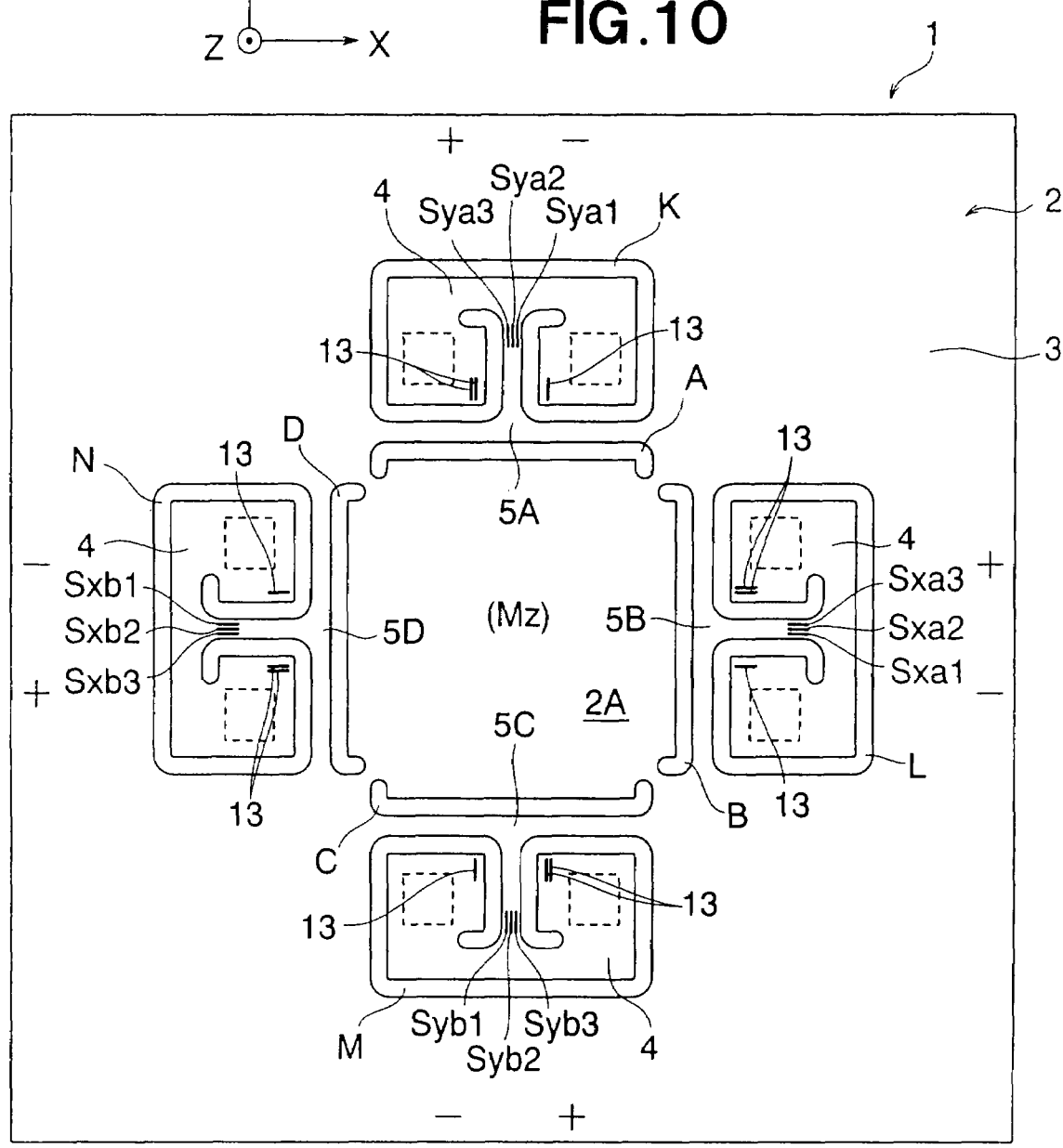
FIG. 10 is a plan view explanatory of an example of behavior of the first embodiment of the force sensor chip when a moment Mz acts on the force sensor chip.

FIG. 10 shows an example of behavior of the force sensor chip 1 when a moment Mz is applied to the force sensor chip 1. Namely, at the time of application of the moment Mz, the resistance elements Sxa1, Sxa3, Sxb1, Sxb3, Sya1, Sya3, Syb1, Syb3 detect strain, and the resistance-change-rate signal Sig6 is determined as $$\text{Sig6}(\approx Mz) = ((R'Sxa3 - R'Sxa1) + (R'Sya3 - R'Sya1) + (R'Sxb3 - R'Sxb1) + (R'Syb3 - R'Syb1))/8$$

Installed positions of the resistance elements Sxa1-Sxa3 and corresponding temperature compensating elements 13 described above in relation to, for example, FIG. 4 are not limited to those shown in FIG. 3. For example, the resistance elements Sxa1-Sxa3 may be installed or disposed on a connecting section P1 between the opposite ends of the elastic section 5Bb of the connecting part 5B and the supporting part 3 with the temperature compensating elements 13 disposed on a section P2 of the operating part 4 shown in FIG. 4. Such alternative layout applies to the other resistance elements Sya1-Sya3, Syb1-Syb3 and Sxb1-Sxb3.

Figure 11:
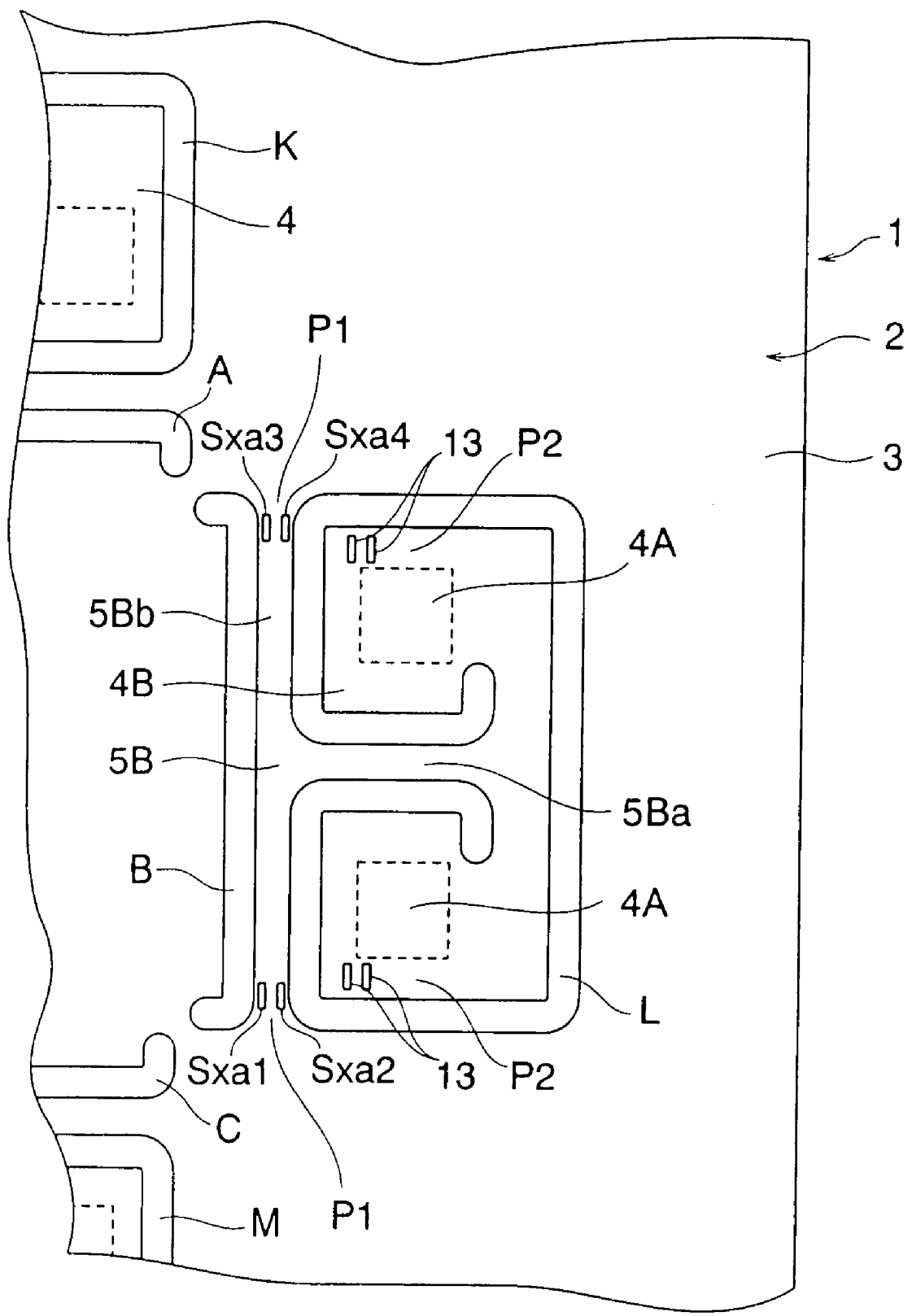
FIG. 11 is a fragmentary enlarged plan view showing electric wiring patterns for some of strain resistance elements on a second embodiment of the force sensor chip.

Next, with reference to FIG. 11, a description will be given about a second embodiment of the force sensor chip of the present invention, where the shape and construction of the semiconductor substrate 2 are the same as those in the first embodiment but the numbers and layout patterns of the strain resistance elements and temperature compensating elements are different from those in the first embodiment. FIG. 11 is a fragmentary enlarged plan view similar to FIG. 4.

The embodiment of the force sensor chip 2 includes a total of sixteen resistance elements Sxa1-Sxa4, Sxb1-Sxb4, Sya1-Sya4 and Syb1-Syb4, and a total of sixteen temperature compensating resistance elements 13 corresponding thereto. Layout pattern of the resistance elements and corresponding temperature compensating resistance elements on the substrate 2 is the same in each of the sets of the resistance elements Sxa1-Sxa4, Sxb1-Sxb4, Sya1-Sya4 and Syb1-Syb4, and thus, the following description will be given representatively only about the set of the resistance elements Sxa1-Sxa4.

In FIG. 11, the four resistance elements Sxa1-Sxa4 are provided in two pairs (Sxa1, Sxa2) and (Sxa3, Sxa4) on two connecting portions P1 between the opposite ends of the elastic section 5Bb of the connecting part 5B and the supporting part 3. The corresponding temperature compensating resistance elements 13 are provided in two pairs on two portions P2 of the operating part 4. The other resistance elements Sxb1-Sxb4, Sya1-Sya4 and Syb1-Syb4 are provided in a similar layout pattern to the resistance elements Sxa1-Sxa4. The other constructions are substantially the same as in the above-described first embodiment. With reference to FIGS. 12-15, the following paragraphs describe a direction of an external force applied to the force sensor chip 1 and mathematical expressions for determining the force.

Figure 15:
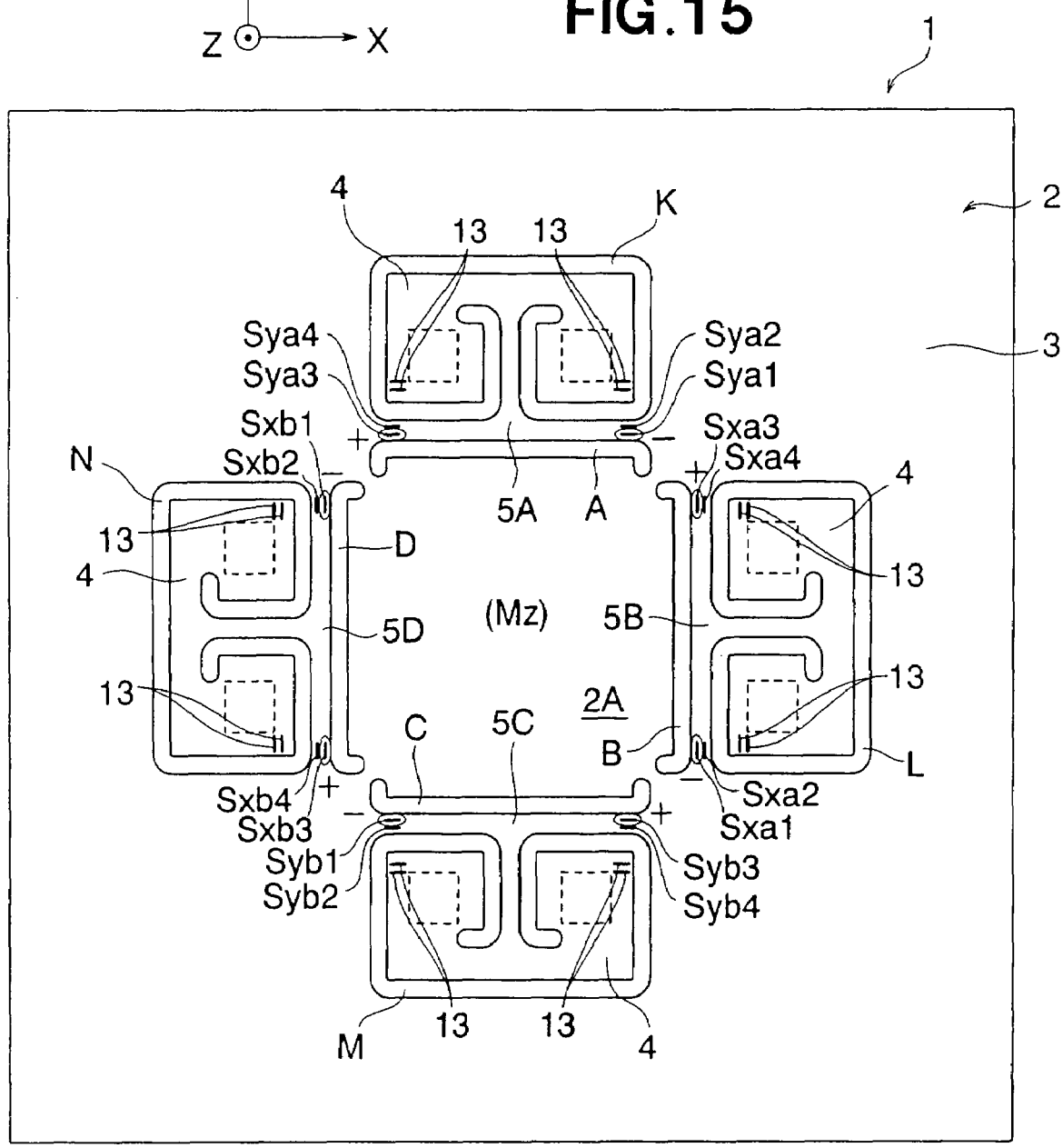
FIG. 15 is a plan view explanatory of an example of behavior of the second embodiment of the force sensor chip when a moment Mz acts on the force sensor chip.

In FIGS. 11 and 15, substantially the same elements as those explained above in relation to the first embodiment are indicated by the same reference characters.

In each of FIGS. 12-15, there is defined a three-dimensional orthogonal coordinate system 21. In these figures, "+" and "−" marks have the same meanings as noted above, and the resistance elements of which the resistance value increases or decreases are shown as enclosed in a circle.

Figure 12:
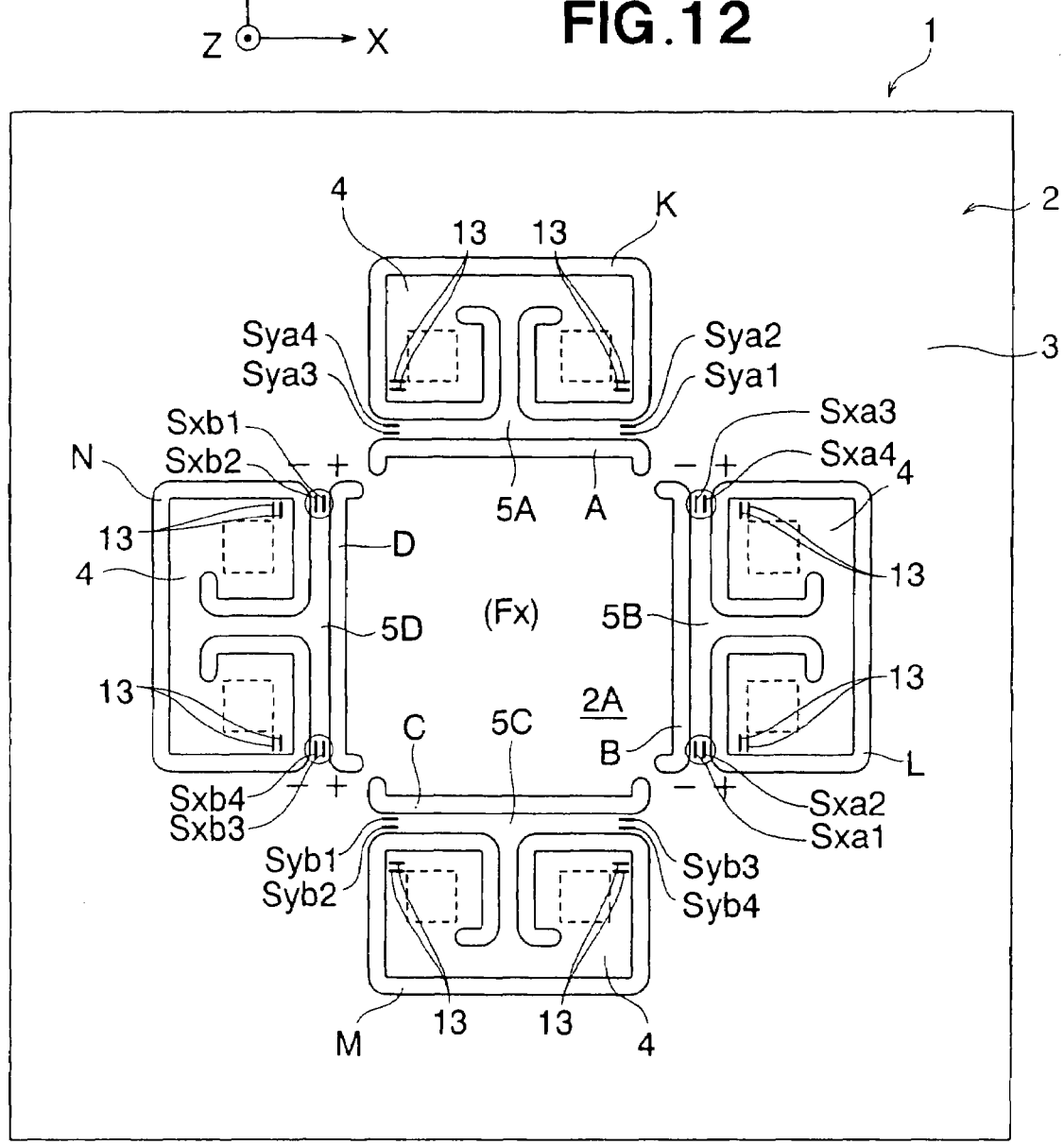
FIG. 12 is a plan view explanatory of an example of behavior of the second embodiment of the force sensor chip when a force Fx acts on the force sensor chip.

FIG. 12 shows an example of behavior of the force sensor chip 1 when an external force Fx is applied to the force sensor chip 1. Namely, at the time of application of the external force Fx, the resistance elements Sxa1-Sxa4 and Sxb1-Sxb4 strain, and the resistance-change-rate signal Sig1 is determined as $$\text{Sig1}(\approx Fx) = ((R'Sxa2 - R'Sxa1) + (R'Sxa4 - R'Sxa3) + (R'Sxb1 - R'Sxb2) + (R'Syb3 - R'Syb4))/8$$

Figure 13:
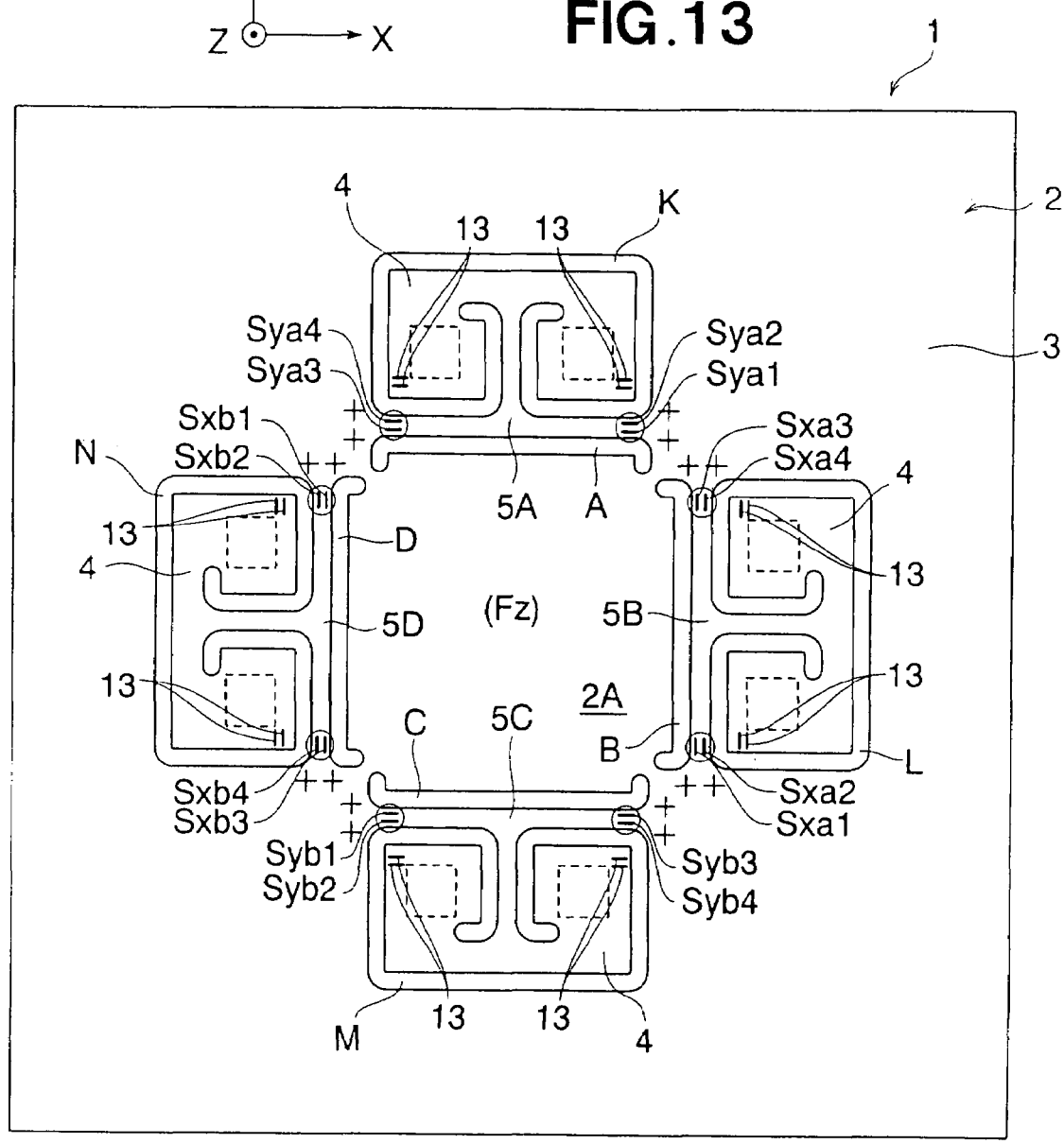
FIG. 13 is a plan view explanatory of an example of behavior of the second embodiment of the force sensor chip when a force Fz acts on the force sensor chip.

FIG. 13 shows an example of behavior of the force sensor chip 1 when an external force Fz is applied to the force sensor chip 1. Namely, at the time of application of the external force Fz, the resistance elements Sxa1-Sxa4, Sxb1-Sxb4, Sya1-Sya4, Syb1-Syb4 detect strain, and the resistance-change-rate signal Sig3 is determined as $$\text{Sig3}(\approx Fz) = (R'Sxa1 + R'Sxa2 + \ldots R'Syb4)/16$$

as $$\text{Sig3}(\approx Fz) = (R'Sxa1 + R'Sxa3 + R'Sxa5 \ldots R'Syb15)/8,$$

or as $$\text{Sig3}(\approx Fz) = (R'Sxa2 + R'Sxa4 + R'Sxa6 \ldots R'Syb16)/8$$

Figure 14:
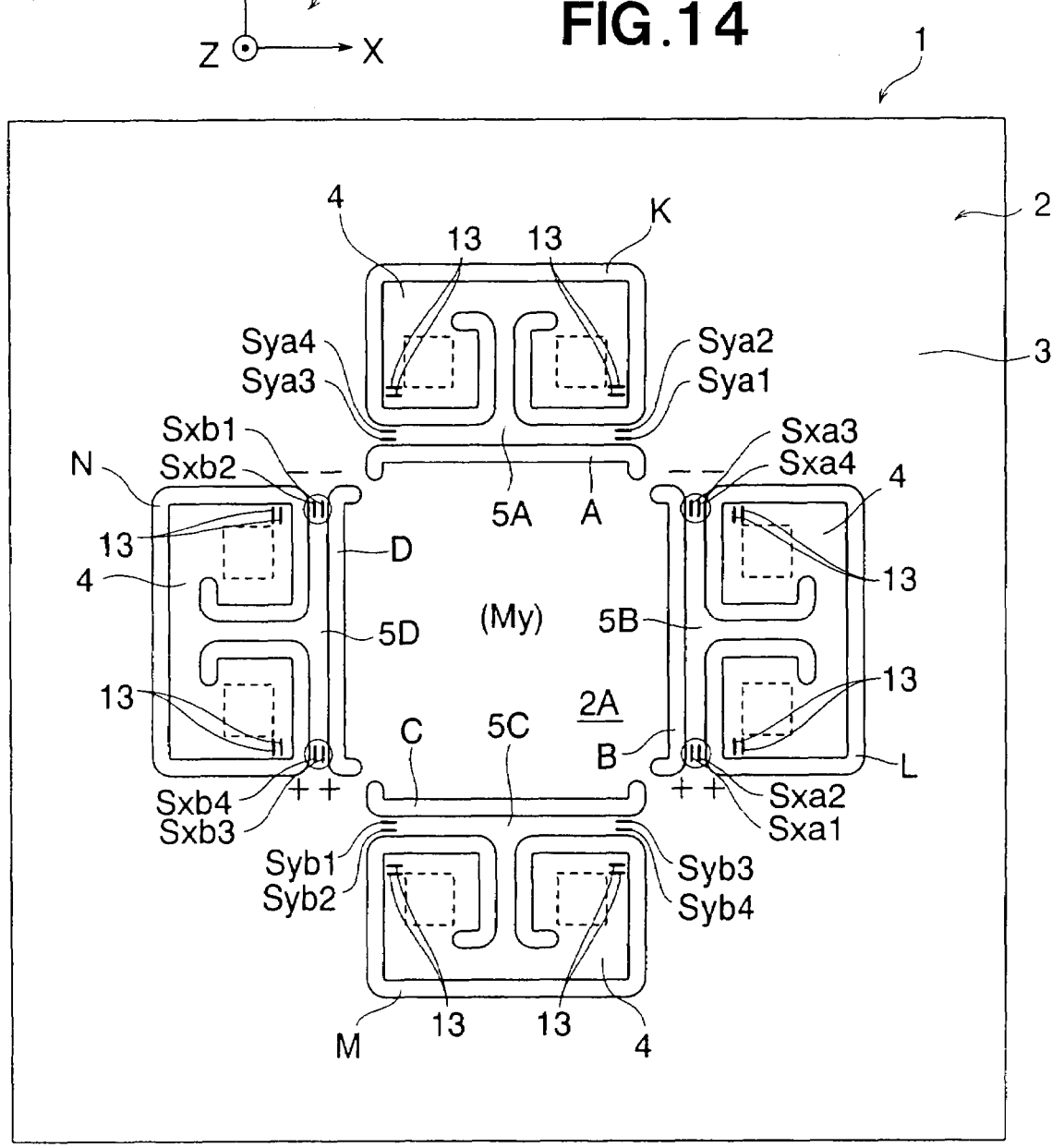
FIG. 14 is a plan view explanatory of an example of behavior of the second embodiment of the force sensor chip when a moment My acts on the force sensor chip.

FIG. 14 shows an example of behavior of the force sensor chip 1 when a moment My is applied to the force sensor chip 1. Namely, at the time of application of the moment My, the resistance elements Sxa1-Sxa4, Sxb1-Sxb4 detect strain, and the resistance-change-rate signal Sig5 is determined as $$\text{Sig5}(\approx My) = ((R'Sxa1 + R'Sxa2) - (R'Sxa3 + R'Sxa4) + (R'Sxb3 + R'Sxb4) - (R'Sxb1 + R'Sxb2))/8$$

FIG. 15 shows an example of behavior of the force sensor chip 1 when a moment Mz is applied to the force sensor chip 1. Namely, at the time of application of the moment Mz, the resistance elements Sxa1, Sxa3, Sxb1, Sxb3, Sya1, Sya3, Syb1, Syb3 detect strain, and the resistance-change-rate signal Sig6 is determined as $$\text{Sig6}(\approx Mz) = ((R'Sxa3 - R'Sxa1) + (R'Sya3 - R'Sya1) + (R'Sxb3 - R'Sxb1) + (R'Syb3 - R'Syb1))/8$$

Figure 16:
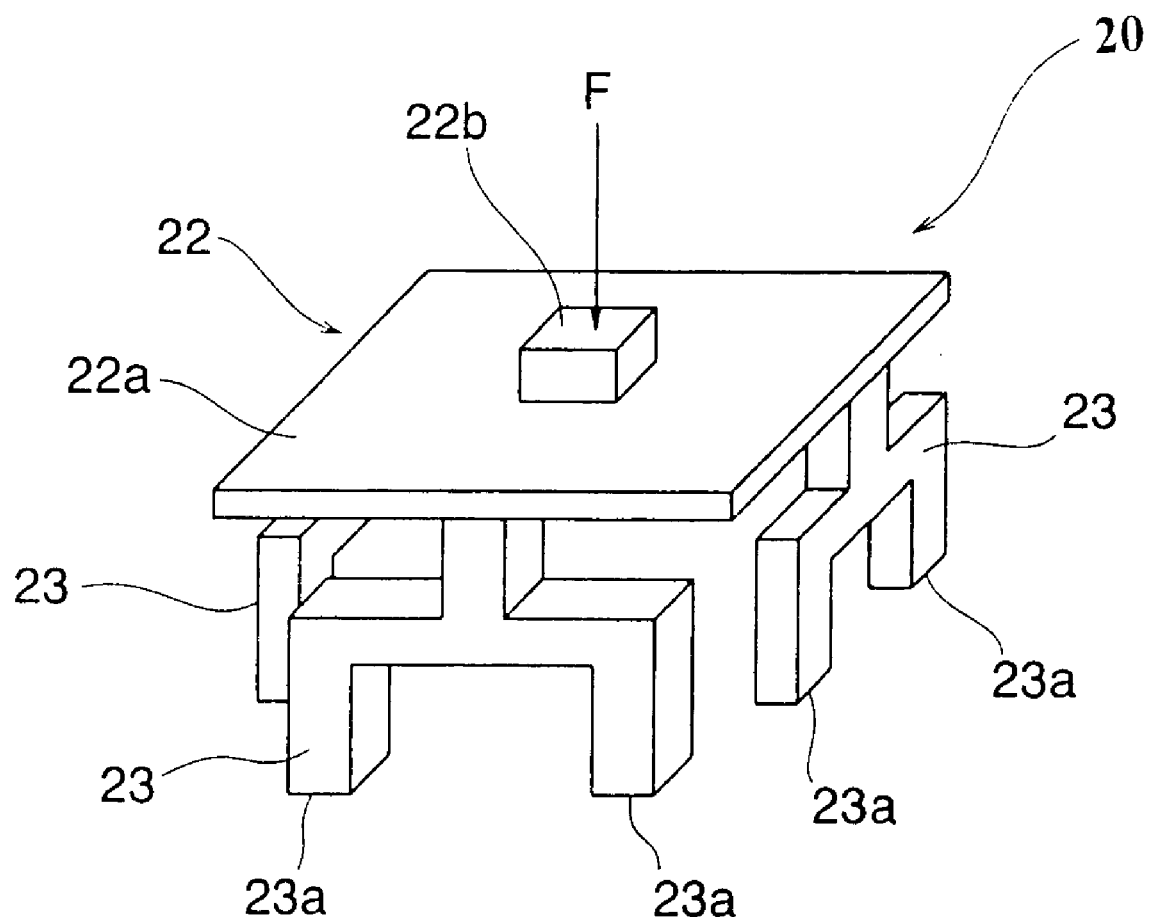
FIG. 16 is a perspective view showing an outer appearance of an external force transmission section employed in the present invention.

Next, with reference to FIG. 16, a description will be given about an example of an external force transmission mechanism 20 that applies an external force to the aforementioned force sensor chip 1 (e.g., first embodiment of the force sensor chip 1). Because the semiconductor substrate 2 in the first embodiment of the force sensor chip 1 includes four operating parts 4 each having two external-force acting area sections 4A as set forth above, the substrate 2 includes a total of eight external-force acting area sections 4A. Normally, in the first embodiment, an external force F input from the outside is applied to the eight external-force acting area sections 4A after being attenuated by a not-shown buffering mechanism (external-force attenuating mechanism). This is for the purpose of preventing the force sensor chip 1 from being damaged by an excessive external force greater than a predetermined magnitude being applied to the semiconductor substrate 2 of the force sensor chip 1. For that purpose, any external force input from the outside is controlled by the external force transmission mechanism 20 so that only a portion of the external force acts on the external-force acting area sections 4A of the operating parts 4.

The external force transmission mechanism 20 comprises an external force receiving section 22 provided on the upper surface of the body of the mechanism 20, and four legs 23 provided beneath the external force receiving section 22.

The external force receiving section 22 includes a plate portion 22a, and an external-force acting portion 22b provided on the upper surface of the plate portion 22a. External force F is applied to the external-force acting portion 22b. For example, the plate portion 22a has a square planar shape as viewed in plan.

Each of the four legs 23 has, for example, a substantially inverted-Y shape with one upper end portion and two lower end portions 23a. The upper end portion of each of the legs 23 is jointed to the underside or undersurface of the plate portion 22a of the external force receiving section 22. The lower end portions 23a of each of the legs 23 are joined to the two external-force acting area sections 4A of the corresponding operating part 4.

With the external force transmission mechanism 20 constructed in the above-described manner, any external force F applied to the external-force acting portion 22b of the external force receiving section 22 is transmitted to the external-force acting area sections 4A of the operating parts 4 in eight dispersed components. In this manner, the external force F applied to the external-force acting portion 22b can be effectively dispersed, so that concentration of stress in a particular operating part of the semiconductor substrate 2 can be reliably prevented.

In the above-described embodiments, the number, positions and shapes of the operating parts 4 can be modified as desired by modifying the number, positions and shapes of the holes A-D and K-N in the semiconductor substrate 2 of the force sensor chip 1.

It should be appreciated that various constructions, shapes, sizes, positions, etc. explained above in relation to the preferred embodiments are just for illustrative purposes, and that the present invention is not limited to the embodiments described above and may be modified variously without departing from the scope indicated by the appended claims.

The present invention can be suitably employed to provide a force sensor chip capable of causing an external force or load to be applied dispersedly to a plurality of operating parts and thereby preventing concentration of stress.

Obviously, various minor changes and modifications of the present invention are possible in light of the above teaching. It is therefore to be understood that within the scope of the appended claims the invention may be practiced otherwise than as specifically described.

What is claimed is:

1. A force sensor chip, comprising:
a base member including
   a plurality of operating parts, each operating part including an external-force acting area section and a non-deforming section,
   a supporting part configured to support said operating parts, and
   a plurality of connecting parts configured to connect said operating parts and said supporting part; and
strain resistance elements provided on deformation-generating sections of said connecting parts, wherein
said plurality of operating parts are provided, in corresponding relation to said plurality of connecting parts, between said connecting parts and said supporting part,
said plurality of operation parts, said supporting part and said plurality of connecting parts are functionally separated from one another by a plurality of elongated through-holes formed in the base member, and each of said connecting parts includes an elastic section and a connecting arm section, and the external force acting area section of each of said operating parts is disposed at both sides of one of said connecting arm sections.

2. The force sensor chip of claim 1, wherein said plurality of operating parts are disposed at equal distances from a center of said base members and circumferentially spaced at equal intervals from each other.

3. The force sensor chip of claim 1, wherein said base member is a semiconductor substrate, and said plurality of operating parts, said supporting section and said plurality of connecting parts are defined by forming said elongated through-holes in the semiconductor substrate.

4. The force sensor chip of claim 1, wherein said base member includes a central part of a substantially square shape formed by four linear slit-like first holes of said plurality of elongated through holes, and four operating parts formed in correspondence with the individual sides of the square-shaped central part.

5. The force sensor chip of claim 1, wherein said elastic section is provided in a region located outwardly of a respective one of the four linear slit-like first holes and said elastic section connects at longitudinal opposite ends thereof to said supporting part.

6. The force sensor chip of claim 1, wherein each of the operating parts is defined by a respective one of slit-like second holes of said plurality of elongated through-holes.

7. The force sensor chip of claim 1, wherein said connecting arm section has one longitudinal end connected to a middle portion of each perspective one of the operating parts and an opposite longitudinal end connected to a middle portion of the elastic section.

8. The force sensor chip of claim 1, wherein the connecting arm sections of said plurality of connecting part have respective longitudinal axes meeting at a common point.

9. The force sensor chip of claim 1, wherein said connecting arm section has one longitudinal end connected to a middle portion of each perspective one of the operating parts, and a set of strain resistance elements of said strain resistance elements is provided on an area of the connecting arm section adjacent to a boundary between the connecting arm section and the corresponding operating part.

10. The force sensor chip of claim 1, wherein said elastic section connects at longitudinal opposite ends thereof to said supporting part, and a set of strain resistance elements of said strain resistance elements is provided on a connecting part between each of the longitudinal opposite ends of the elastic section and said support part.

11. The force sensor chip of claim 1, further comprising:
a temperature compensating resistance element provided on said non-deforming section of each of said operating parts.

12. An external force transmission mechanism that applies an external force to the force sensor chip of claim 1, said external force transmission mechanism comprising:
an external force receiving section including a plate portion and an external-force acting portion provided on an upper surface of the plate portion; and
a plurality of legs provided beneath said external force receiving section, each of the legs having a substantially inverted Y-shape with one upper end portion and two lower end portions, said one upper end portion of each of the legs being joined to an undersurface of said plate portion, and said lower end portions of each of the legs being joined to two external force acting area sections of each of the operating parts that are disposed at both sides of one of said connecting arm sections.

* * * * *